US007744739B1

(12) United States Patent
Green

(10) Patent No.: US 7,744,739 B1
(45) Date of Patent: Jun. 29, 2010

(54) SPIRAL-WOUND CYLINDRICAL ELECTROSTATIC OIL CLEANER

(75) Inventor: Thomas B. Green, Liberty Township, OH (US)

(73) Assignee: CLARCOR Inc., Franklin, TN (US)

( * ) Notice: Subject to any disclaimer, the term of this patent is extended or adjusted under 35 U.S.C. 154(b) by 101 days.

(21) Appl. No.: 11/961,534

(22) Filed: Dec. 20, 2007

Related U.S. Application Data

(60) Provisional application No. 60/875,937, filed on Dec. 20, 2006.

(51) Int. Cl.
*B01D 35/06* (2006.01)

(52) U.S. Cl. ........................ 204/665; 204/670; 204/671

(58) Field of Classification Search ................. 204/665, 204/670, 671, 559, 554; 55/DIG. 5; 96/99
See application file for complete search history.

(56) References Cited

U.S. PATENT DOCUMENTS

| | | | | |
|---|---|---|---|---|
| 3,930,982 | A | | 1/1976 | Batha et al. |
| 3,980,541 | A | * | 9/1976 | Aine .......................... 204/554 |
| 4,234,324 | A | * | 11/1980 | Dodge, Jr. ....................... 96/99 |
| 5,501,783 | A | * | 3/1996 | Kawasaki ................... 204/665 |
| 5,661,117 | A | | 8/1997 | Dufresne |
| 5,785,861 | A | | 7/1998 | Dufresne |
| 6,190,432 | B1 | | 2/2001 | Gieseke et al. |
| 2006/0091061 | A1 | | 5/2006 | Brown |
| 2006/0091066 | A1 | | 5/2006 | Driml et al. |
| 2006/0091084 | A1 | | 5/2006 | Merritt et al. |
| 2006/0151655 | A1 | | 7/2006 | Johnston |
| 2007/0186528 | A1 | | 8/2007 | Wydeven et al. |

* cited by examiner

*Primary Examiner*—Harry D Wilkins, III
*Assistant Examiner*—Bryan D. Ripa
(74) *Attorney, Agent, or Firm*—Reinhart Boerner Van Deuren P.C.

(57) ABSTRACT

A cylindrical oil contamination collector for removal of ultra-fine particulate includes a rectangular and continuous length of single-sided, corrugated, phenolic coated paper overlaid with three rectangular electrodes affixed thereto in a spaced-apart, side-by-side arrangement. Two of the electrodes are electrode grounds and the other electrode is a high voltage electrode. The phenolic coated paper is spiral-wound into a continuous spiral with at least one of the three rectangular electrodes sandwiched between adjacent, overlapping turns of the spiral-wound phenolic coated paper.

17 Claims, 7 Drawing Sheets

SPIRAL-WOUND CYLINDRICAL ELECTROSTATIC OIL CLEANER

CROSS-REFERENCE TO RELATED APPLICATIONS

This application claims priority to U.S. Provisional Patent Application Ser. No. 60/875,937, filed Dec. 20, 2006.

TECHNICAL FIELD

This application relates generally to electrostatic oil cleaners that remove contaminant from insulating liquids such as hydrocarbon base-stocks, and synthetic base-stocks capable of being used as lubricants for turbines, gas engines, hydraulic applications, and manufacturing processes, and more particularly to an electrostatic oil cleaner that includes a continuous spiral-wound sandwich of materials that is suitable to fit into an appropriately sized cylindrical oil contamination collector vessel.

BACKGROUND

Cleanliness of fluids is commonly measured using laser particle counters. Particle count can be represented in two different formats:

(i) ISO 4406 (1998) which measures total particle numbers per milliliter of fluid, by scaling the particle numbers in a range from 1-28, and the total particle count from 0.01 to 250,000. Particle count is measured in a 3-digit code X representing total particles >4 μm, Y representing total particles >6 μm, and Z representing total particles >14 μm.

(ii) NAS 1638 separates total particle count into 5 size ranges; 5-15 μm, 15-25 μm, 25-50 μm, 50-100 μm, and >100 μm.

Overall fluid particle code is a singular number that defines the worst particle count of the 5 scales. Total particle count is measured per 100 milliliters of fluid.

Laser particle counters can be limited in their ability to accurately measure small particles. Their ability to measure particles is often accepted as greater than 4.6 μm in size, leaving all particulate smaller than 4.6 μm as not reportable by this method.

It is also understood that the total number of particles in a typical in-service hydraulic or lubricating fluid contains 95% of contaminants that are less than 4.6 μm.

Existing configurations and design of electrostatic oil purifiers is varied. Electrostatic purifiers can often be categorized into 2 types:

A) Electrostatic purifiers induce a charge on the insoluble particles in the fluid and allow the capture of those particles in a collection medium. These electrostatic purifiers may be referred to as electrostatic oil cleaners.

B) Electrostatic purifiers that induce agglomeration, and make no attempt to contain flocculated particles within the fluid processing unit. These electrostatic purifiers depend on external mechanical filtration equipment to collect flocculated particles, and may be described as uncontained agglomeration purifiers.

Both purifier types depend upon a non-conductive environment to operate. Their performance can be impacted when conductive fluids, such as water, is introduced.

Voltage levels for type A purifiers are in the general range of about 10 kV to 15 kV. With reference to FIG. 1, reproduced from a paper presented by Akira Sasaki and Shinji Uchiyame, reference NCFP 102-1.2/SAE OH 2002-01-1352 (the Sasaki paper), it shows that the if oil flow is not precisely controlled, a net negative charge will be applied to the oil, as it continues on its path throughout the circulating oil system. Agglomeration of particles within the negatively charged oil occurs throughout the oil system. It can therefore be important to optimize a purifier design that minimizes voltage applied to the electrodes, so that external agglomeration does not occur.

Type B purifiers that initiate uncontained agglomeration may be represented by Munson WO 03/000406 A1, whereby a dual polarity electrode system is utilized to apply an appropriate voltage greater than 13 kV to apply a charge on particulate contaminant, and to a lesser degree on the fluid depending on its dielectric properties. The charge applied to the fluid and contaminants is dispersed throughout the entire fluid volume, whereby agglomeration occurs throughout the fluid system. Rate of agglomeration in a typical large gas turbine application will be dependant on parameters such as oil velocity and temperature in small hydraulic lines, electrostatic relaxation properties, fluid turbidity in large oil return lines to the turbine oil reservoir and air release properties of the fluid, along with oil residence time in the operating reservoir. Removal of particles is dependant on conventional mechanical filtration medias located external to the electrostatic high voltage electrodes and vessels containing same thereof.

Fouling of last-chance filters located in sensitive servo-valve hydraulic systems used to control gas turbine air-flow variable geometry is often initiated by the agglomeration process. This process is clearly undesirable.

There are several different concepts of cylindrical collectors that attempt to capture contaminants within the fluid processing unit. The Kawasaki U.S. Pat. No. 5,501,783 construction includes of a series of cylindrical components, including, multiple layers of pleated paper, interlined with cylindrical sheets of phenolic paper, and cylindrical electrodes. Each component is manufactured individually, cut to precise length, glued into a cylindrical shape, and finally installed into the outermost aluminum ground electrode. The integrity for eliminating oil channeling voids within the collector, when oil flows from bottom to top is dependent on the tight, and close tolerance between each successive layer of material. This type of construction is time consuming and leads to inconsistencies in product quality control and overall efficiencies of operation. Since oil flow is from bottom-to-top of collector in the '783 patent, there is opportunity for oil channeling along the walls of the phenolic paper inserts, see FIG. 2. The relatively large area within the paper pleats decreases the migration vector of small particles that may be centered between the pleats. The pleats form a triangle having approximately a 12 mm base and a 12 mm height.

SUMMARY

In an aspect, a cylindrical oil contamination collector for removal of ultra-fine particulate includes a rectangular and continuous length of single-sided, corrugated, phenolic coated paper overlaid with three rectangular electrodes affixed thereto in a spaced-apart, side-by-side arrangement. Two of the electrodes are electrode grounds and the other electrode is a high voltage electrode. The phenolic coated paper is spiral-wound into a continuous spiral with at least one of the three rectangular electrodes sandwiched between adjacent, overlapping turns of the spiral-wound phenolic coated paper.

In another aspect, a method of forming a cylindrical oil contamination collector is provided. The method includes providing a rectangular and continuous length of single-sided, corrugated, phenolic coated paper. Three electrodes are affixed to the phenolic coated paper in a side-by-side and spaced apart arrangement where two of the electrodes are electrode grounds and the other electrode is a high voltage electrode. The phenolic coated paper is rolled about a mandrel to form a continuous spiral with at least one of the three rectangular electrodes sandwiched between adjacent, overlapping turns of the spiral-wound phenolic coated paper.

The details of one or more embodiments are set forth in the accompanying drawings and the description below. Other features, objects, and advantages will be apparent from the description and drawings, and from the claims.

DETAILED DESCRIPTION

The collector construction described below includes a layer of single-sided corrugated phenolic coated paper (hereafter called CPP) overlaid with typically three electrodes, including two ground electrodes, and one high voltage electrode. Once the electrodes are glued or otherwise affixed to the corrugated paper, the layered material is simply wound-up using a mandrel of suitable diameter that insures the finished contamination collector has the proper inside diameter to install into a selected series of contamination collection vessels, or containers.

The dielectric properties of most industrial lubricants are sufficiently high such that only one continuous layer of CPP is often needed, however, fluids that have a lower-than-normal dielectric property, such as degraded phosphate ester synthetic chemicals will often drop the high voltage electrode supply potential to about 60 percent of normal, when utilizing a constant-current power supply. In fluids with low dielectric properties, an additional layer of CPP may be added on top of the first layer, the electrodes being secured to the second layer of paper. In this manner, operation of the contamination collector in a fluid having low dielectric properties will operate at the desired 10-12 kV potential.

Fabrication of the contamination collector layers before rolling the layers can take less than about five minutes. Rolling-up of the materials using a mandrel of suitable diameter along with approximately three pounds of tension on the open-end of the materials, provides a consistently tight integration of the spiral-wound media. The end of the roll includes the ground electrode material, which overlaps approximately one inch, so that is can be stapled to complete the manufacture of the collector.

In order to achieve maximum electrostatic field within the collector, micro-expanded metal (e.g., instead of aluminum) can be used for the electrodes. The micro-expanded metal (hereto called the MEM) dimensionally can be 000 to 0.118 inches in the short-way and 000 to 0.236 inches in the long-way. Material height is 0.009 inches. The roughness and combinations-permutations of pointed-sharp edges can play a role in promoting optimum electrostatic field within the contamination collector.

Figure 1:
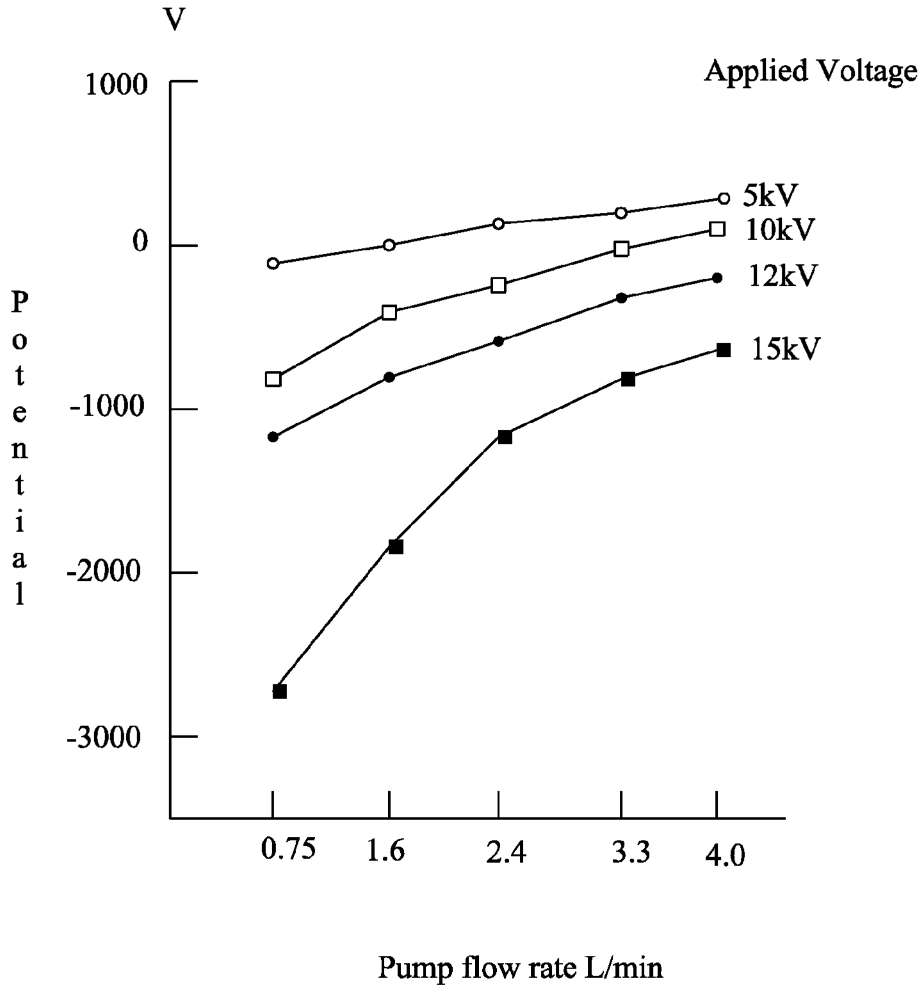
FIG. 1 is a plot of potential versus pump flow rate for a purifier.
Figure 2:
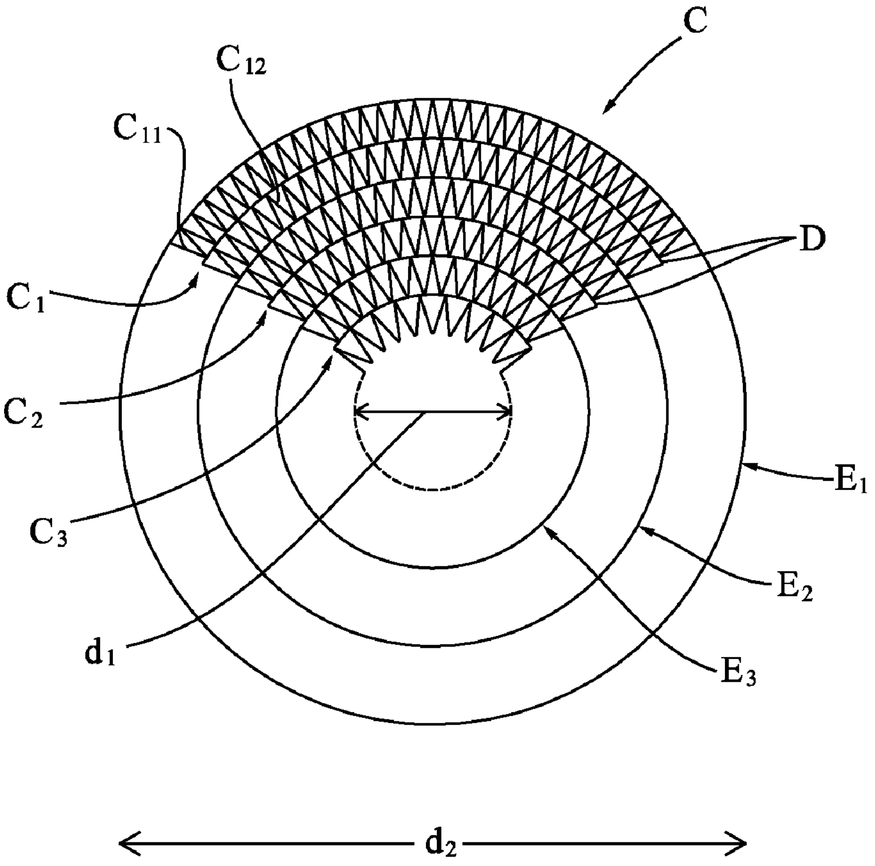
FIG. 2 PRIOR ART
FIG. 2 is a diagrammatic, plan view of a prior art cylindrical collector.
Figure 3:
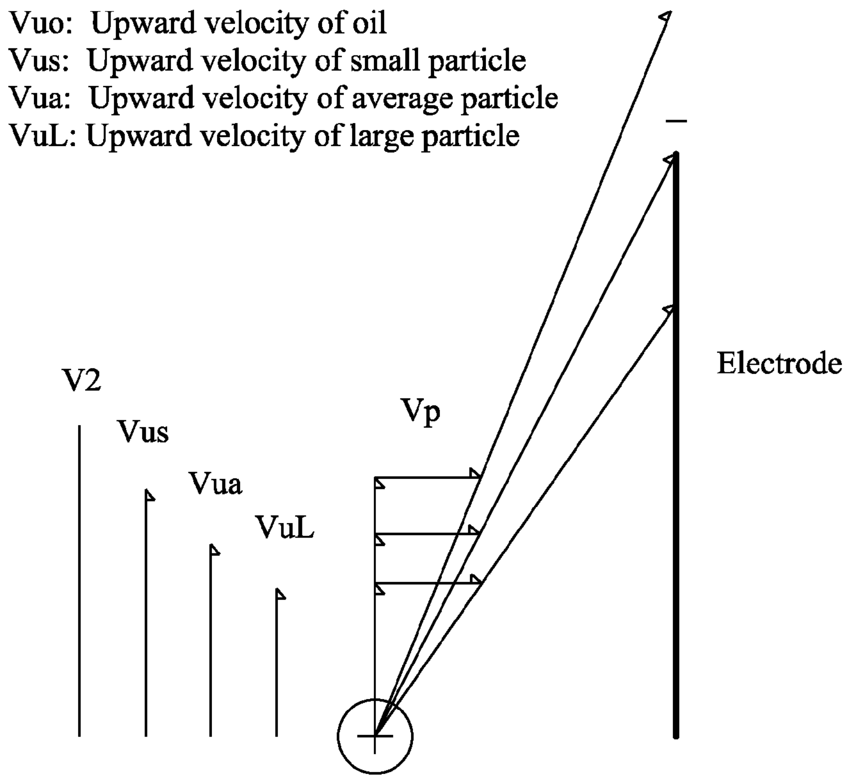
FIG. 3 illustrates factors that impact the ability to flocculate particles.

The use of four millimeters (or less, such as between about two millimeters and about four millimeters, such as about three millimeters) CPP optimizes the collection of the smallest of flocked particles. If we refer to the FIG. 3, reproduced from the Sasaki paper, there are a number of factors that can impact the ability to capture the smallest of particles, and trap them on the media. Some of the those factors include (i) the width of the pleated channels whereby oil flows from bottom to top of the collector, (ii) the velocity of the oil referenced in FIG. 3 as Vuo, (iii) the velocity of the largest particle referenced in FIG. 3 as VuL and (iv) the velocity of the smallest particle referenced in FIG. 3 as Vus.

In order to optimize the collection of the smallest of particles, the width of the oil channeling galleys can be minimized, without causing excess oil differential pressure. Use of two to three millimeters width of the oil channeling galleys, can offer the potential for the smallest of particles to have the shortest migration vector towards the negative electrode before it exits the contamination collector. The material thickness of the spiral-wound collector can be chosen for two reasons: to optimize the collection of small particles when fluid water levels are higher than normal, as well as continue to capture small particles when the high voltage is reduced as a result of increased water levels.

Figure 4A:
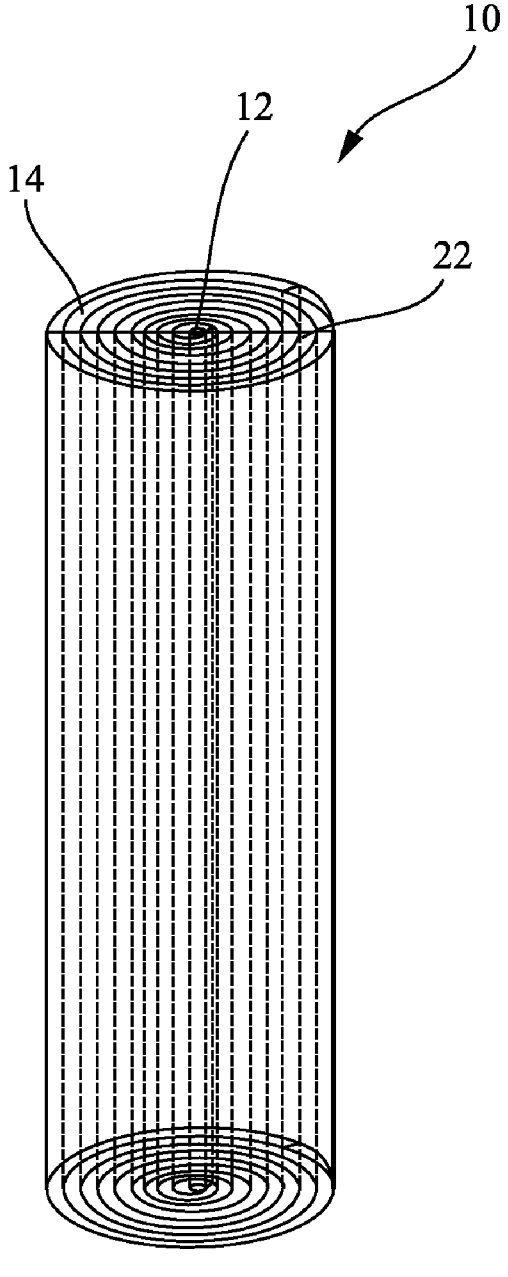
FIGS. 4A and 4B are diagrammatic, perspective and top views, respectively, of an embodiment of a spiral-wound collector.
Figure 4B:
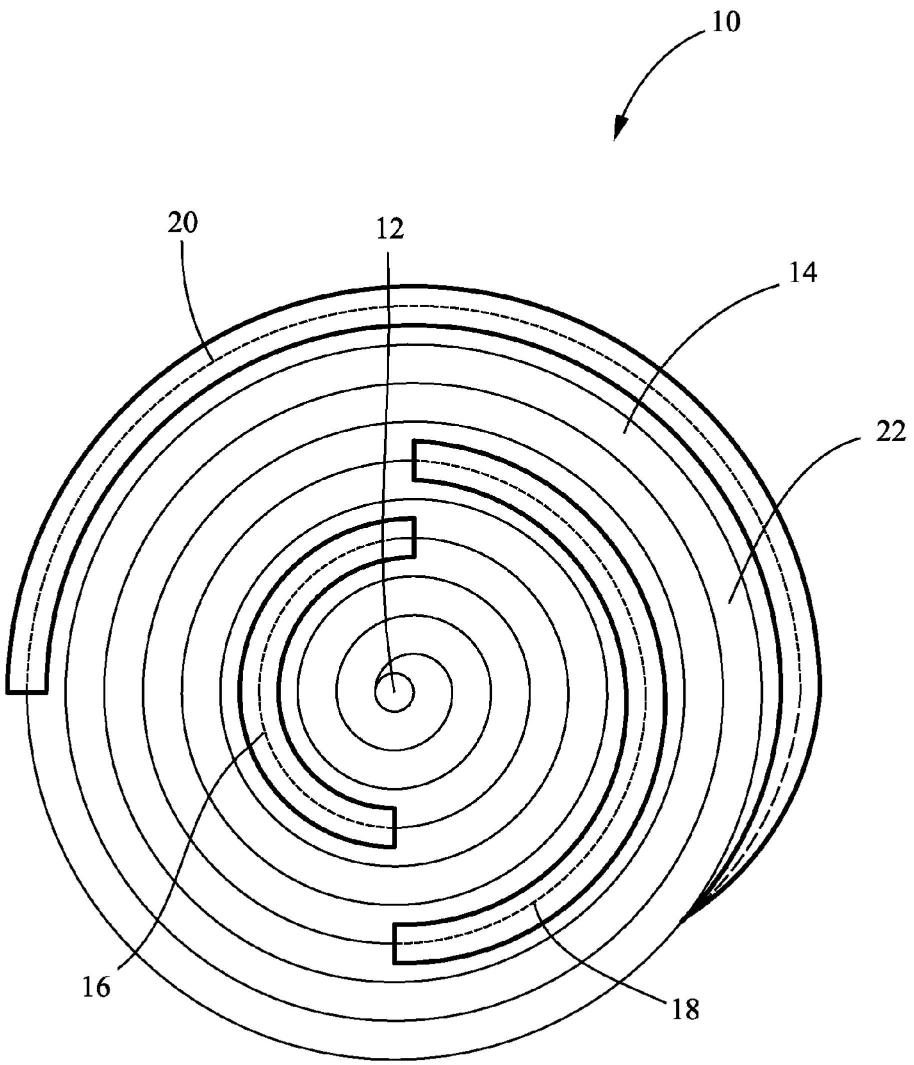

Referring now to FIGS. 4A and 4B, a contamination collector 10 is illustrated in its spiral-wound form and rolled about a mandrel 12. The collector 10 includes a plurality of multiple, continuous turns 14 formed of CPP 22 with at least electrodes 16 and 18 sandwiched between adjacent turns. Electrode 20 is located at the outermost turn and is the greatest radial distance from a central axis of the contamination collector, electrode 18 is an intermediate radial distance from the central axis and electrode 16 is the closest radial distance to the central axis. In some embodiments, electrode 20 overlaps the CPP 22 only partially (e.g., one inch) so that it can be stapled to complete manufacture of the collector 10. Location of the electrodes 16, 18 and 20 can be dependent on the finished outside diameter of the collector 10 as well as the desired inside diameter of the collector. In some embodiments, aluminum (smooth or dimpled) is used to form one or more of the electrodes 16, 18 and 20.

Figure 5:
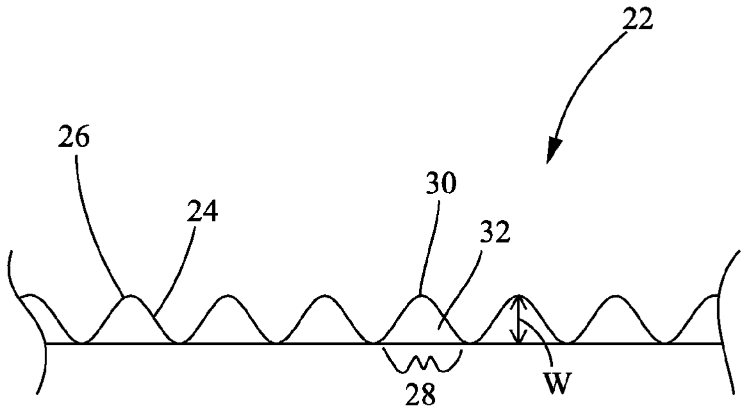
FIG. 5 is a diagrammatic, detail view of an embodiment of a layer of single-sided corrugated phenolic coated paper.

Referring briefly to FIG. 5, the CPP 22 includes a corrugated layer 24 which is formed of multiple corrugations 26. The corrugations 26 each include a base portion 28 and a peak 30 thereby defining an oil channeling galley 32 therebetween having a width W defined as a distance from the base portion 28 to the peak 30. The width W is preferably four millimeters or less, such as between about two and about four millimeters, such as about three millimeters.

Figure 6:
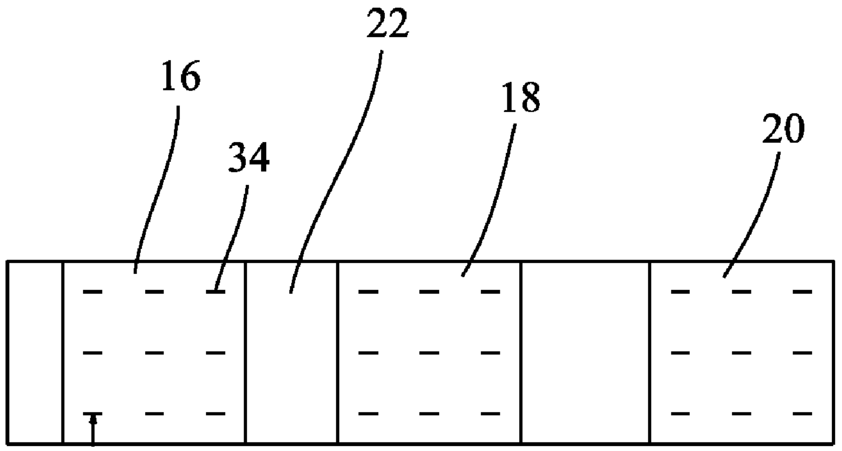
FIG. 6 is a diagrammatic, plan view of an embodiment of a laminate material in its flat, laid-out state prior to rolling the material to form the collector of FIG. 4.

FIG. 6 illustrates the laminate material in its flat, laid-out state prior to rolling the material. The CPP 22 provides a base material to which the electrodes 16, 18 and 20 are affixed side-by-side and spaced-apart from each other in the long direction of the CPP. In some embodiments, the electrodes 16, 18 and 20 are affixed to the CPP by glue 34 so that the electrodes do not move during the rolling process. Electrodes 16 and 20 are ground electrodes, while electrode 18 located therebetween is a high voltage (e.g., between about 10 kV and 12 kV), positive electrode. Once the electrodes 16, 18 and 20 are affixed to the CPP 22, the laminate material is rolled about the mandrel 12. While electrodes 16, 18 and 20 may be any suitable size, electrode 16 may be about 16 inches by 23 inches, electrode 18 may be about 23.5 inches by 23 inches and electrode 20 may be about 31.75 inches by 24 inches. The electrodes 16, 18 and 20 have a flexibility such that they can be rolled into the spiral shape.

The above-described collector can have a number of advantages. For example, the manufacture of the electrostatic collector can be exceptionally simple and efficient compared to known collectors. In some instances, the total manufacturing time for the collector is about 20 minutes. In some embodiments, sandwiched layer of CPP and MEM electrode material can be sized of variable rectangular area, locating the electrodes on top of the continuous piece of CPP, such that any diameter and height of contamination collector can be manufactured.

An additional embodiment is the use of additional medias such as fibrous ceramics, or woven polypropylene cloth that can provide a corrugated width of about three to six mm. An additional advantage is to use multiple layers of CPP in order to optimize high voltage electrode potential when processing fluids with lower than normal dielectric properties.

The above-described, spiral-wound particle contamination collector addresses the smallest of particles, in particular those ultra-fine particulates between 0 μm and 5 μm as well as amorphous (soft particles) that may be products of oxidation, or soft carbon from explosive decompression of air-entrained oil flowing through high pressure gear pump sets. Efficiencies can provide a greater than 90 percent reduction of the contamination levels measured by millipore patch tests from 0.22 μm to 5 μm.

Oil flow through the collector 10 can be from bottom to top or top to bottom.

It is to be clearly understood that the above description is intended by way of illustration and example only and is not intended to be taken by way of limitation, and that changes and modifications are possible. Accordingly, other embodiments are contemplated and modifications and changes could be made without departing from the scope of this application.

What is claimed is:

1. A cylindrical oil contamination collector for removal of ultra-fine particulate, comprising:

a rectangular and continuous length of single-sided, corrugated, phenolic coated paper overlaid with three rectangular electrodes affixed thereto in a spaced-apart, side-by-side arrangement where two of the electrodes are electrode grounds and the other electrode is a high voltage electrode, the phenolic coated paper being spiral-wound into a continuous spiral with at least one of the three rectangular electrodes sandwiched between adjacent, overlapping turns of the spiral-wound phenolic coated paper.

2. The cylindrical oil contamination collector of claim 1, wherein the phenolic corrugated paper includes corrugations having a width of no more than about 4 millimeters.

3. The cylindrical oil contamination collector of claim 2, wherein the corrugations have a width of between about 2 millimeters and about 4 millimeters.

4. The cylindrical oil contamination collector of claim 3, wherein the corrugations have a width of about 3 millimeters.

5. The cylindrical oil contamination collector of claim 1, wherein the phenolic coated paper is a first layer of the phenolic coated paper, a second rectangular and continuous length of single sided, corrugated, phenolic coated paper being overlaid by the first layer of the phenolic coated paper.

6. The cylindrical oil contamination collector of claim 1, wherein the three electrodes comprise aluminum.

7. The cylindrical oil contamination collector of claim 1, wherein a first one of the three electrodes remains radially interior to a second one of the three electrodes in the continuous spiral.

8. The cylindrical oil contamination collector of claim 1, wherein the three rectangular electrodes are affixed to the paper such that the paper remains uncovered by the three electrodes in at least one region of the paper between adjacent ones of the three electrodes.

9. The cylindrical oil contamination collector of claim 1, wherein each of the three electrodes are radially separated from one another by a plurality of the adjacent overlapping turns of the paper in the continuous spiral.

10. A method of forming a cylindrical oil contamination collector, comprising:

providing a rectangular and continuous length of single-sided, corrugated, phenolic coated paper;

affixing three electrodes to the phenolic coated paper in a side-by-side and spaced apart arrangement where two of the electrodes are electrode grounds and the other electrode is a high voltage electrode; and rolling the phenolic coated paper about a mandrel to form a continuous spiral with at least one of the three rectangular electrodes sandwiched between adjacent, overlapping turns of the spiral-wound phenolic coated paper.

11. The method of claim 10, wherein the step of affixing the three electrodes to the phenolic coated paper comprises gluing.

12. The method of claim 10, comprising tensioning the phenolic paper with a force of about three pounds as the phenolic coated paper is rolled.

13. The method of claim 10, wherein the phenolic corrugated paper includes corrugations having a width of no more than about 4 millimeters.

14. The method of claim 10, wherein the phenolic coated paper is a first layer, the method further comprising affixing a second layer of the continuous length of single-sided, corrugated, phenolic coated paper to the first layer, the first layer overlapping the second layer.

15. The method of claim 10, wherein the step of rolling includes rolling the paper such that a first one of the three electrodes remains circumferentially overlapped on either end thereof by at least one of a second and a third one of the three electrodes.

16. The method of claim 10 wherein the step of affixing further includes selecting the three electrodes such that each one of the three electrodes has a different width than each other one of the three electrodes.

17. The method of claim 10, wherein the step of affixing includes affixing a first one of the three electrodes proximate to a first end of the paper, affixing a second one of the three electrodes in a spaced apart relationship from the first one such that a region of exposed paper exists therebetween, and affixing a third one of the three electrodes to a second end of the paper such that the third one of the three electrodes extends beyond the second end of the paper.

* * * * *